United States Patent Office 3,523,952
Patented Aug. 11, 1970

3,523,952
PROCESS FOR PREPARING PYRRYL-(2)-ACETONITRILES
Winfried Orth, Schifferstadt, Ludwig Rappen, Duisburg-Meiderich, and Gerd Busse, Krefeld, Germany, assignors to Rutgerswerke und Teerverwertung Aktiengesellschaft, Frankfurt am Main, Germany
No Drawing. Filed Nov. 28, 1967, Ser. No. 686,305
Claims priority, application Germany, Dec. 3, 1966, R 44,719
Int. Cl. C07d 27/26
U.S. Cl. 260—326.62                 4 Claims

ABSTRACT OF THE DISCLOSURE

Pyrryl-(2)-acetonitriles corresponding to the formula

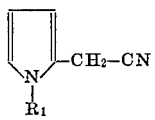

wherein $R_1$ stands for hydrogen or an alkyl group having 1–4 carbon atoms, are prepared from dialkyl-[pyrryl-(2)-methyl]-amines corresponding to the formula

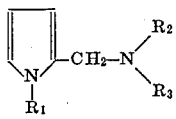

in which $R_1$ stands for hydrogen or an alkyl group having 1–4 carbon atoms and $R_2$ and $R_3$ stand for alkyl groups having 1–4 carbon atoms, are converted by alkylation —e.g. with dimethylsulfate—into the corresponding trialkyl-[pyrryl-(2)-methyl]-ammonium salts and reaction of the latter with the aqueous solution of an alkali cyanide. Alkylation is carried out in aqueous suspension and the reaction of the resulting mixture with the solution of the alkali cyanide takes place with the simultaneous addition of a solvent which is not miscible with water and in which the pyrryl -(2)-acetonitrile is soluble.

It has been known to prepare pyrryl-(2)-acetonitriles, for example pyrryl-(2)-acetonitrile and N-methyl-(2)-acetonitrile, by reacting trimethyl-[pyrryl-(2)-methyl]-ammonium-iodide or trimethyl - [N - methylpyrryl-(2)-methyl]-ammonium-iodide, respectively, with sodium cyanide. Trimethyl-[pyrryl-(2)-methyl]-ammonium-iodide and trimethyl-[N-methyl-pyrryl-(2)-methyl]-ammonium-iodide are formed in known manner by adding methyl-iodide to an alcoholic solution of dimethyl-[pyrryl-(2)-methyl]-amine or dimethyl-[N-methyl-pyrryl-(2)-methyl]-amine, respectively, see J. Amer. Chem. Soc. 73, 4921 (1951) and J. Amer. Chem. Soc. 75, 483 (1953).

The above mentioned processes have particularly the disadvantage that the ammonium salts prepared from the Mannich bases by reaction with alkyl iodides in absolute alcohol must be isolated prior to their further reaction to the corresponding nitriles. Furthermore, the isolated ammonium compounds decompose easily, whereby the yield of pyrrylacetonitriles is adversely affected.

The main object of the present invention is the preparation of pyrryl-(2)-acetonitriles from dialkyl-[pyrryl-(2)-methyl]-amines in a one-stage procedure, without isolation of the ammonium compounds and with higher yields. This object is attained by preparing a compound corresponding to the formula

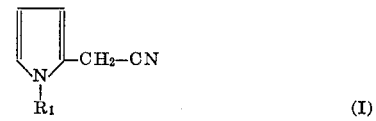

in which $R_1$ is hydrogen or an alkyl group containing 1–4 carbon atoms, by alkylation of dialkyl-[pyrryl-(2)-methyl]-amines corresponding to the formula

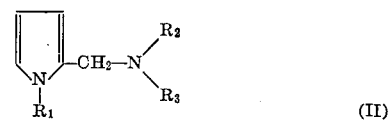

in which $R_1$ is hydrogen or alkyl, and $R_2$ and $R_3$ are alkyl radicals, $R_1$ being hydrogen or an alkyl group containing 1–4 carbon atoms and $R_2$ and $R_3$ being alkyl radicals containing 1–4 carbon atoms. The compound corresponding to Formula II is converted by alkylation into the corresponding trialkyl - [pyrryl-(2)-methyl]-ammonium salts. Alkylation is carried out in aqueous suspension. In the resulting reaction mixture the reaction with aqueous alkali cyanide solution is carried out with simultaneous addition of a solvent which is not miscible with water and in which the pyrryl-(2)-acetonitriles to be formed are soluble.

Examples of suitable alklating agents are alkyl sulfates, such as e.g. dimethylsulfate, alkyl halogenides, e.g. methyl iodide, and arylalkyl halogenides, e.g. benzylchloride. In the reaction of the not isolated ammonium salts with alkali cyanides in the presence of an organic solvent which is not miscible with water, and in which the pyrryl-(2)-acetonitriles formed are well soluble, particularly high yields are obtained. By proceeding in this manner, undersired saponification of the pyrryl-(2)-acetonitriles to pyrryl-(2)-acetic acid amides by the alkaline effect of the cyanide solution, is well prevented. Examples of such solvents are benzene and its homologs and halogenated alkanes, such as for example, benzene, toluene, xylene, chlorinated hydrocarbons having a boiling point above the reaction temperature, e.g. ethylene chloride, trichloroethylene, perchloroethylene, methylchloroform, are mentioned. The reaction with alkali cyanides takes place at temperatures in the range of 40° to 100° C., preferably in the range of 60 to 90° C.

The following examples illustrate some embodiments of the invention, to which the invention is not limited.

EXAMPLE 1

276 g. of dimethyl-[N-methylpyrryl-(2)-methyl]-amine are suspended in 300 ml. of water, mixed under stirring and cooling with 190 ml. of dimethylsulfate and then stirred for 1 hour. Subsequently 1000 ml. of toluene and a solution of 220 g. of sodium cyanide in 100 ml. of water are added. Upon heating to about 80° C. the reaction starts and is completed by maintaining this temperature for 2 hours. The toluene layer formed is separated and the aqueous phase is once more extracted with toluene and the extract is added to the separated toluene layer. distillation of the toluene solution yields 199 g. of N-methyl-pyrryl-(2)-acetonitrile (boiling point $_{0.1}$:72–76° C.: $n_{20}$:1.5148).

This corresponds to a yield of 83% calculated on the weight of the Mannich base charged.

EXAMPLE 2

To a suspension of 183 g. of dimethyl-[N-methylpyrryl-(2)-methyl]-amine in 100 ml. of water 130 g. of benzylchloride are dropwise added and then stirred for 2 hours.

Subsequently a solution of 110 g. sodium cyanide—or of 145 g. of potassium cyanide—in 100 ml. water, and 500 ml. of perchloroethylene are added and the reaction is carried out during 2 hours at 80–90° C. The perchloroethylene layer formed is separated from the aqueous layer which is then once more extracted with perchloroethylene. The perchloroethylene solution which is dried over potassium carbonate, yields upon distillation 77 g. of N-methyl-pyrryl-(2)-acetonitrile (boiling point$_{0.1}$:75–80° C.). This corresponds to a yield of 64%, calculated on the weight of the charged dimethyl-[N-methylpyrryl-(2)-methyl]-amine.

EXAMPLE 3

A mixture of 221 g. of dimethyl-[N-methylpyrryl-(2)-methyl]-amine and 500 ml. water is mixed with 268 g. of methyl iodide and the resulting mixture is stirred at ordinary room temperature, e.g. 18–20° C., for 30 minutes. Subsequently 800 ml. of toluene and 176 g. of sodium cyanide are added and the mixture is slowly heated to 80° C. The reaction is continued for 2 hours, after which the two layers formed are separated at 85° C. and the separated aqueous phase is once more extracted with 400 ml. of toluene. The combined toluene extracts yield by distillation 115 g. of N-methylpyrryl-(2)-acetonitrile (boiling point$_{0.05}$: 70–80° C., $n_{20}$:1.5147). This corresponds to a yield of 60% calculated on the weight of the charged Mannich base.

The compounds prepared by the process of this invention can be utilized as starting materials for the preparation of known phenothiazine derivatives which are useful in medicine as antihistamines, spasmolytica and local anesthetics. Thus, for example, pyrryl-(2)-acetonitrile can be converted into a pyrryl-(2)-acetic acid ester, e.g. according to the process disclosed in the patent application "Process for Preparing Pyrryl-(2)-Acetic Acid Esters" filed in our names simultaneously under Ser. No. 686,286, and the pyrryl-(2)-acetic acid ester can be converted into the phenothiazine derivative 10-[2-(1'-methyl-2'-pyrrolyldyl)-ethyl]-phenothiazine which has antihistaminic activity, in the manner disclosed in said patent application filed in our names simultaneously.

The parts and percent described herein are by weight if not otherwise stated.

The figure 0.1 means the pressure in atmospheres under which the boiling point was measured and the recitation $n_{20}$ means the index of refraction for any substance, which is the ratio of the velocity of light in a vacuum to its velocity in the substance at a temperature of 20° C.

The term Mannich base means the reaction product of a CH-acid compound with formaldehyde and ammonia or an amine respectively by aldol condensation. The Mannich reaction is defined e.g. in "Namensreaktionen der organischen Chemie" of Helmut Krauch and Werner Kunz, 1961, p. 304.

What is claimed is:
1. A process for preparing pyrryl-(2)-acetonitriles corresponding to the formula

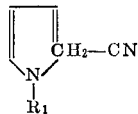

wherein $R_1$ is selected from the group consisting of hydrogen and alkyl groups having 1–4 carbon atoms, essentially consisting of converting a dialkyl-(pyrryl-(2)-methyl)-amine corresponding to the formula

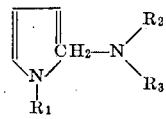

in which $R_1$ is selected from the group consisting of hydrogen and alkyl groups having 1–4 carbon atoms and $R_2$ and $R_3$ stand for alkyl groups having 1–4 carbon atoms, by reacting said dialkyl-(pyrryl-(2)-methyl) amine in aqueous suspension in the presence of a solvent which is not miscible with water and in which pyrryl-2-acetonitriles are soluble, said solvent being selected from the group consisting of benzene, toluene, xylene, ethylene chloride, trichloroethylene, perchloroethylene, methylchloroform, with an alkylating agent selected from the group consisting of dimethylsulfate, methyliodide and benzyl chloride; and subsequent reaction of the resulting reaction mixture with an aqueous solution of an alkalicyanide at a temperature in the range of 40 to 100° C., with the formation of an aqueous phase and a solvent phase, and separating said solvent phase from said aqueous phase.

2. A process as claimed in claim 1 in which said reaction with alkalicyanide is carried out at a temperature in the range of 60–90° C.

3. A process as claimed in claim 1, in which the pyrryl-(2)-acetonitrile is recovered from said solvent phase by distillation.

4. A process as claimed in claim 1, in which said aqueous phase is subjected to extraction with a solvent which is not miscible with water and in which pyrryl-(2)-acetonitriles are soluble.

References Cited

Herz: J. Am. Chem. Soc., 75:483 (1953).
Herz et al.: J. Am. Chem. Soc., 73:4921–23 (1951).

ALEX MAZEL, Primary Examiner
J. A. NARCAVAGE, Assistant Examiner

U.S. Cl. X.R.
260—326.3, 326.9, 243